United States Patent [19]

Miller

[11] Patent Number: 4,555,033

[45] Date of Patent: Nov. 26, 1985

[54] SLACKLESS NON-CUSHIONED DRAWBAR ARRANGEMENT FOR RAILWAY CAR UNDERFRAME

[75] Inventor: Roy W. Miller, Highland, Ind.

[73] Assignee: Pullman Standard, Inc., Chicago, Ill.

[21] Appl. No.: 538,549

[22] Filed: Oct. 3, 1983

[51] Int. Cl.⁴ .............................................. B61G 5/02
[52] U.S. Cl. ......................................... 213/51; 105/3; 213/54; 213/62 R
[58] Field of Search ...................... 105/3, 4 R; 213/50, 213/51, 54, 56, 62 R, 62 A, 64

[56] References Cited

U.S. PATENT DOCUMENTS

| | | | |
|---|---|---|---|
| 1,877,335 | 9/1932 | Lounsbury | 213/54 X |
| 3,716,146 | 2/1973 | Altherr | 213/64 X |
| 4,236,644 | 12/1980 | Depenti | 213/62 R |
| 4,258,628 | 3/1981 | Altherr | 105/4 R |
| 4,336,758 | 6/1982 | Radwill | 105/4 R |
| 4,422,557 | 12/1983 | Altherr | 213/62 R |
| 4,456,133 | 6/1984 | Altherr et al. | 213/62 R |
| 4,480,758 | 11/1984 | Hurt et al. | 213/54 |

FOREIGN PATENT DOCUMENTS 1605195 4/1980 Fed. Rep. of Germany .... 213/62 R

Primary Examiner—Robert B. Reeves
Assistant Examiner—David F. Hubbuch
Attorney, Agent, or Firm—Richard J. Myers & Assoc., Ltd.

[57] ABSTRACT

A railway car underframe center sill includes a drawbar structure which includes a rigid housing structure adapted to fit into the cushion pocket of the sill supporting the cushion. The rigid housing is readily removable if desired and includes a rigid end plate having a truncated opening which contains a truncated hemispherical reaction member which pivots in any direction. The drawbar is supported on the center sill for movement in true rotation and is provided at its inner end with an impact head at all times in flush contact with the hemispherical reaction member. The end of the drawbar includes a drawbar key structure secured in place by means of the draft key. The housing structure is securely maintained in position against a stop by a wedge member which is self-adjusting downwardly as wear may occur and thus insures a contact rigid effective assembly.

This assembly provides a slackless condition in the drawbar attachment between companion units of a railway freight car.

17 Claims, 5 Drawing Figures

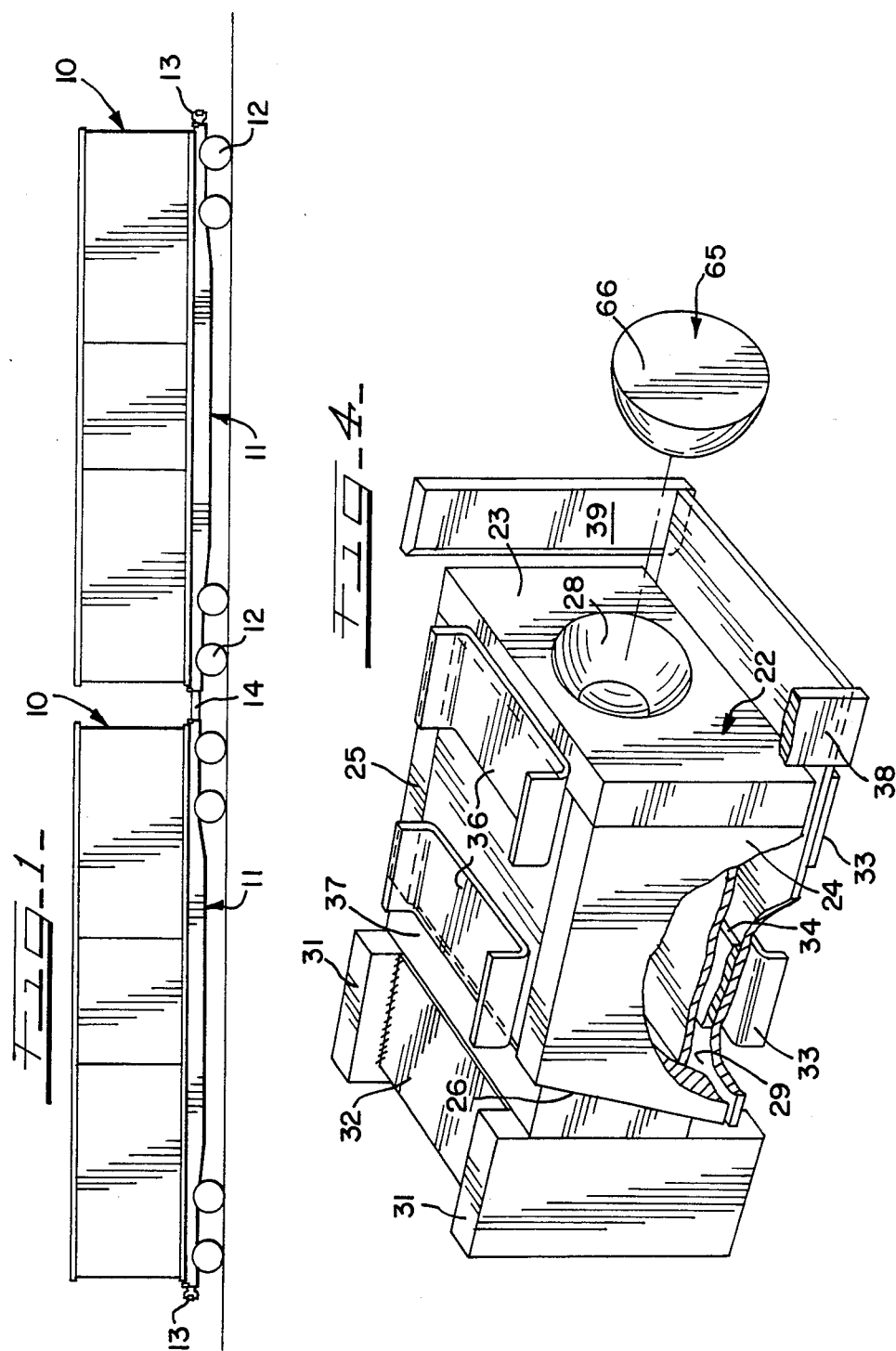

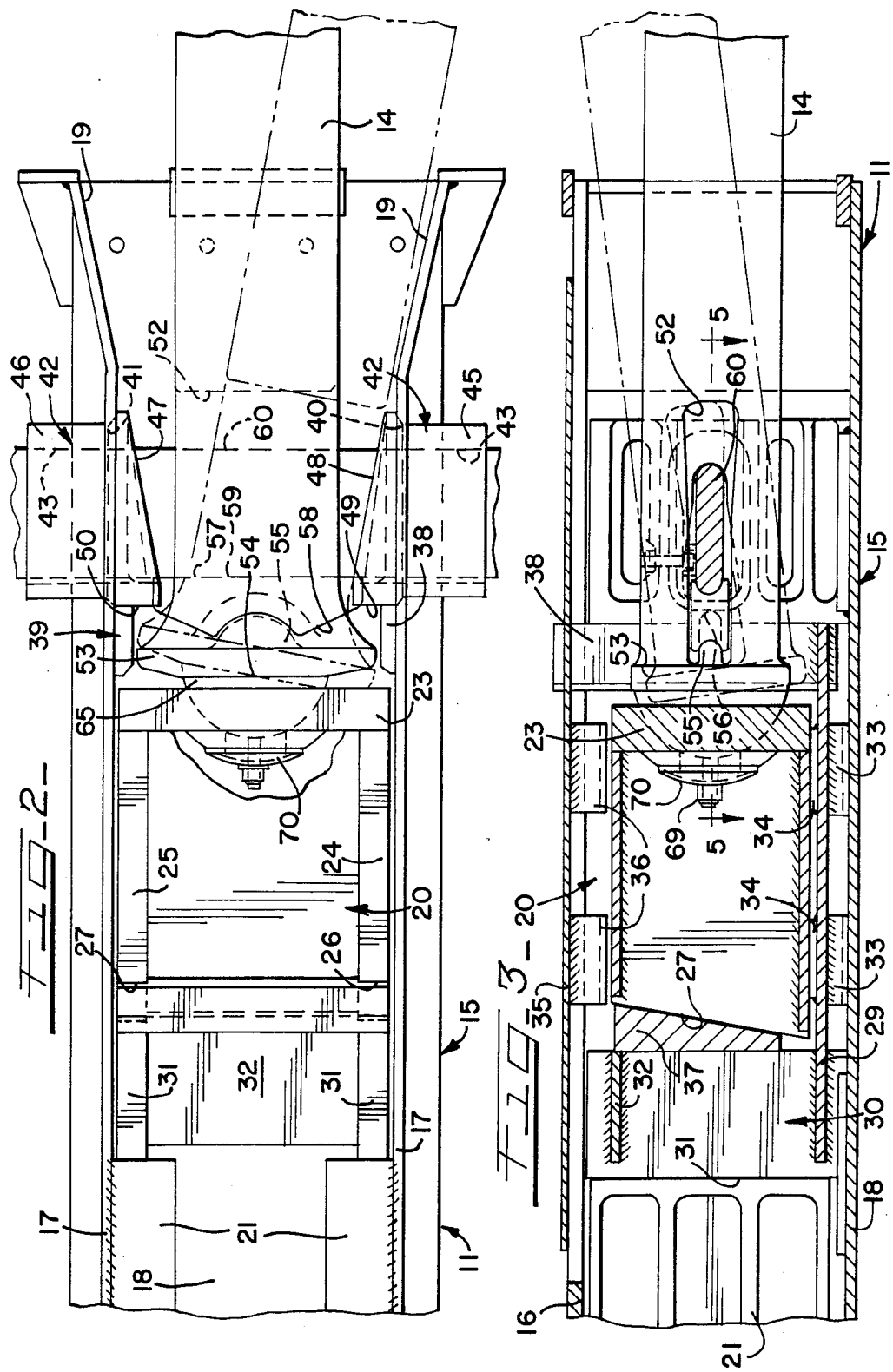

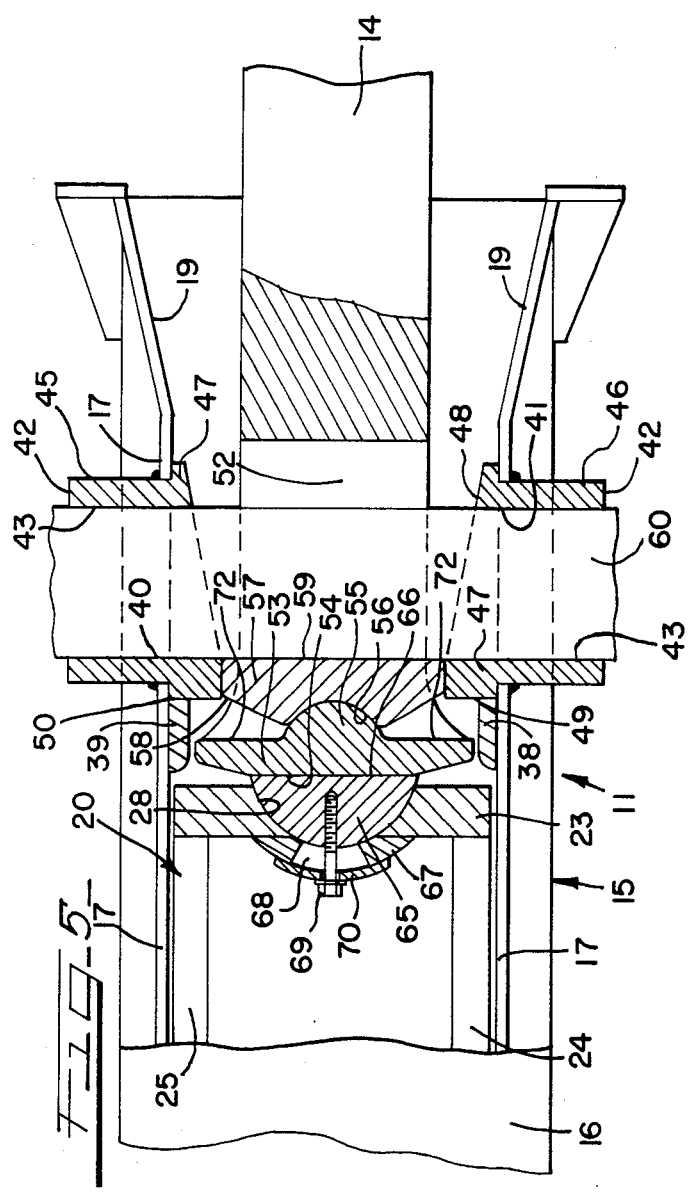

SLACKLESS NON-CUSHIONED DRAWBAR ARRANGEMENT FOR RAILWAY CAR UNDERFRAME

BACKGROUND OF THE INVENTION

1. Field of the Invention

The present invention relates to railway car underframes and particularly to a non-cushioned drawbar connection to a center sill having a cushion pocket.

2. Description of the Prior Art

The prior art is replete with inventions relating draft gears, cusioning devices and drawbar and coupler structures. The present invention is primarily concerned with a drawbar adaptation to a car underframe also provided with a cushion pocket. U.S. patents particularly concerned with adapter structures are U.S. Pat. Nos. 2,212,843; 2,241,353; 3,610,436; 3,211,296; and 3,708,075. None of these patents disclose the principles of the present invention.

SUMMARY OF THE INVENTION

The present invention comprises a railway car underframe having a relatively conventional center sill which includes at its end flared side wall portions providing a bell mouth configuration. Spaced from the end of the sill is a conventional cushion pocket with a suitable cushion stop. In the present invention the cushion is replaced by a rigidly constructed housing which is placed into the pocket includes rigid frame members which are capable of withstanding the impact loads to which the center sill is subjected.

The housing is supported on vertical spacer members projecting upward from the bottom of the sill structure and upper spacers project downwardly from the cover member, which is removable. A vertical plate of substantial strength is secured to the front end of the housing and includes a central tapered opening which supports a hemispheric impact reaction member within the opening. This reaction member includes a flat vertical impact receiving surface and can pivot within its sewat or tapered opening conforming in shape to the reaction member. The housing has a tapered rear position which is contained in the pocket by a wedge shaped securing member. As the housing decreases in size due to wear the wedge shaped member adjusts to the wear by sliding downwardly and securely maintaining the housing in position.

Vertical spacer bars are located at the forward end of the rigidly constructed housing support plate. These bars limit the lateral movement of the drawbar impact base and keep it centered over the hemispheric impact reaction member.

The drawbar is positioned within the sill for swinging movement but is non-cushioned and by virtue of its engagement and relation to the reaction member eliminates all slack making it an effective rigid structure with excellent curving characteristics.

BRIEF DESCRIPTION OF THE DRAWINGS

FIG. 1 is a side elevational view of a pair of railway freight cars connected together by drawbar structures of the present improvement.

FIG. 2 is a cross-sectional plan view through a center sill and underframe construction of a railway car;

FIG. 3 is a cross-sectional side view of the center sill and underframe disclosed in FIG. 2;

FIG. 4 is fragmentary perspective view of the parts of a rigid housing structure which is incorporated in the cushion pocket of a center sill; and FIG. 5 is a cross-sectional view taken along the line 5—5 of FIG. 3.

DESCRIPTION OF THE PREFERRED EMBODIMENT

Referring to the drawings FIG. 1 discloses a pair of railway cars 10 including bodies carried on underframes 11 supported on conventional car trucks 12. The front and rear ends of the cars 10 are provided with conventional couplers 13, whereas the adjacent ends of the car disclosed are interconnected by a drawbar 14. As shown in FIGS. 2 and 3, underframe 11 comprises essentially a center sill structure 15 including a top wall 16, side walls 17, and bottom wall 18. The front of the center sill 15 includes diverging wall portions 19 of generally bell mouth shape and to which a bell mouth housing could be attached for long shank coupler application.

A cushion pocket is designated at 20 and includes at one end a pair of stops 21 which are also used when a cushioning device is placed in the pocket. In the present slackless drawbar design the cushioning unit is replaced with a rigid housing 22 and associated parts, best disclosed in FIG. 4. The housing 22 comprises a front wall 23 connected to side walls 24 and 25. The side walls 24 and 25 have tapering or sloping end portions 26 and 27. The front wall includes a hemispherical concave opening 28. The hosing 22 is seated upon a longitudinally extending plate 29 welded at its rearmost end to a spacer element designated at 30. The spacer element 30 comprises two upright blocks 31 having an upper transverse strap 32 connected thereto. The plate 29 and housing 22 are supported on a plurality of spacer elements 33 seated upon the bottom wall 18.

Spaced wear plates 34 are seated upon the upper surface of the plate 29 and support the housing structure 22. A removable top cover plate 35, also including spacer members 36, securely maintains the housing 22 in proper position within the pocket. The cover plate 35 is suitably secured to the upper sill all by suitable fasteners, not shown. A wedge 37 is wedged into the space between the tapered end portions 26 and 27 and the spacer 30 which tightly maintains the housing in the position shown in FIG. 3. The bottom plate 29 also projects forwardly as shown in FIGS. 3 and 4 and connects to and supports vertical reinforcing plates 38 and 39. Plates 38 and 39 project upwardly through openings in the cover plate 35.

The center sill side walls 17 are provided with openings 40 and 41 which receive cheek plates 42 providing aligned openings 43 respectively in outer projecting portions 45 and 46. The cheek plates 42 also include inwardly projecting bosses 47 and 48 which provide vertical draft faces 49 and 50 as best shown in FIGS. 2 and 5. The drawbar 14 inlcudes an elongated slot 52 which extends forwardly as indicated to a head or impact and buff member 53 which has an impacting surface 54 and a curved or convex projection 55 which is disposed in a concave recess 56, as best shown in FIG. 5, defined by a recessed face portion of a drawbar keeper 57. The keeper 57 includes a conical outer surface 58 and includes a horizontal wall portion 59 which is locked in position between the draft faces or lugs 49 and 50 against the draft key 60 extending through the openings 43 of the cheek plates and through the slot 52 of the drawbar 14.

As best shown in FIGS. 4 and 5 a hemispherical reaction member 65 is disposed in the wall 23 for tilting or multiple pivotal movement. The reaction member 65 includes an impact face 66 which is flush in engagement with the impact face 54 of the impact member 53. The wall or plate 23 includes an inner extending curved wall portion 67 suitably apertured as indicated at 68. A threaded fastener 69 extends through a concave-convex washer 70 to connect the impact reaction member in the opening 28. The aperture 68 permits movement of the impact reaction member in universal directions with the drawbar. The drawbar head also includes portions 72 which limit the lateral movement by engaging vertical space bars 38 and 39.

Operation

As shown in FIG. 1, the drawbar connects the cars together when it is desired to have this type of operation. In the present disclosure the drawbar is non-cushioned and slackless operation is achieved. In this operation any cushion within the pocket is removed and the spacer 30, plate 29, spacers 33 and the housing structure 22 is placed into the pocket, including the wedge, cover plate and associated structure. The drawbar is installed with the drawbar key in position relative to the hemispherical reaction member. The impact face 54 is flush against the face of the reaction member and the keys 57 and 60 are in position. The drawbar now is free to move during car operation in the desired manner.

Thus the invention resides in the structure enclosed which includes the truncated hemispheric reaction assembly which pivots in any direction, and the back-up structure provided by the housing which quickly replaces the cushion assembly. Also the wedge arrangement eliminates any and all slack in the compartments both when installed and as wear occurs. As such wear occurs the wedge merely moves down by gravity and takes up any slack which might exist.

The plan view of FIG. 2 discloses that the drawbar and truncated hemispheric reaction member move with true rotation, or have no relative sliding as the drawbar tens to pivot about the edge of the draft key slot horizontal curving. As shown in elevation, there is a combination rotation and relative sliding as the drawbar tends to pivot about the edge of the draft key slot for vertical curving.

What is claimed is:

1. In a railway car underframe including a sill structure comprising spaced vertical sill walls and horizontal upper and lower sill walls connected to said vertical walls,
   a pocket assembly having a stop end,
   a housing structure supported in said pocket assembly, said housing structure including
   laterally spaced side walls,
   a front transverse wall connecting said side walls,
   said sill structure including at a forward end a bell mouth diverging portion spaced from said housing structure,
   said forward end of said sill structure including laterally spaced cheek plates supported on said vertical sill walls and including draft key openings in lateral alignment,
   the improvement comprising
   a drawbar assembly having at a rearward portion thereof a transversely extending elongated slot,
   a draft key supported in the laterally aligned openings of said cheek plates and projecting through said slot,
   said drawbar having an impact head including laterally spaced impact projections,
   an impact reaction member supported on said transverse wall of said housing structure,
   said reaction member being pivotally supported on said transverse wall for multiple pivotal movement, and,
   keeper means engaging and preventing longitudinal translation of the drawbar and providing for pivotal movement of said drawbar in multiple directions while maintaining contiguous contact between said reaction member and said impact head.

2. The improvement in accordance with claim 1, said reaction member having a truncated hemispherical portion engaging said transverse wall to allow for multiple pivotal movement with respect to said transverse wall.

3. The improvement in accordance with claim 2, said transverse wall of said housing structure including an opening receiving and supporting said reaction member for multiple pivotal movement of the same.

4. The improvement in accordance with claim 3, said cheek plates having vertically extending abutment surfaces engaged by said impact projections.

5. The improvement in accordance with claim 4, said keeper means including a drawbar keeper within said drawbar slot for maintaining said impact head in alignment with said reaction member.

6. The improvement of claim 5, said drawbar keeper means being disposed between said vertically extending abutment surfaces of said cheek plates.

7. The improvement in accordance with claim 6, said drawbar keeper means having a recessed face portion and said impact head including a projection seated within recessed face portion.

8. The improvement in accordance with claim 7, said pocket assembly including vertical reinforcing plates supported on the side walls of said sill adjacent to said abutment surfaces of said cheek plates.

9. The improvement in accordance with claim 3 said opening in said transverse wall being complemental in shape to said reaction member.

10. The improvement in accordance with claim 9, including means removably connecting said hemispherical reaction member within said complemental opening.

11. The improvement in accordance with claim 1, said slot in said drawbar providing for upward pivoting movement and horizontal swinging movement of said drawbar.

12. In a railway car underframe including a sill structure having laterally spaced upright sill walls and top and bottom walls,
    a bell mouth housing portion provided at a forward portion of said sill structure,
    a cushion pocket spaced rearwardly from said bell mouth housing portion,
    said cushion pocket having a rear stop means,
    a housing structure adapted to fit in said cushion pocket when said underframe is utilized with a drawbar,
    spacer means in said cushion pocket for supporting said housing structure for horizontal movement within said cushion pocket,
    a drawbar mounted on said sill structure,
    said drawbar including an elongated transverse slot, a draft key carried by said center sill extending through said slot and supporting said drawbar, said drawbar having an impact head projecting into said cushion pocket, an impact reaction member engaging said impact head, support means on said housing structure for supporting the impact reaction member in a plurality of angular positions responsive to angular movement of the drawbar with respect to the sill structure for maintaining the impact head in engagement with the impact reaction member, said housing structure comprising a wall structure rigidly connected together and extending longitudinally within said cushion pocket, and means between said housing structure and said stop means for locking said housing structure against horizontal movement in said cushion pocket.

13. The improvement in accordance with claim 12, said housing structure having rear tapering portions, and the means for locking having
wedge means against said stop means and said tapering portions for locking said housing in said pocket.

14. The improvement in accordance with claim 13, said wedge means against said tapering portions being self-adjusting by gravity as the tapering portions and housing structure wear during use.

15. The improvement in accordance with claim 14, said spacer means for supporting said housing structure including raised spacer members supported on said sill.

16. In a railway car underframe including a sill structure having
laterally spaced upright sill walls and top and bottom walls, a cushion pocket assembly having a stop end, a housing assembly supported in said pocket assembly for horizontal movement therein, said housing assembly comprising laterally spaced side walls, a front wall connected to said side walls, a top wall and a bottom wall, a drawbar mounted on said sill structure forwardly of said cushion pocket assembly for vertical and sideways swinging movement, said drawbar having an impact end adapted to engage said front wall of said housing assembly, said front wall having support means thereon and impact reaction means supported on the support means, said impact reaction means engaging said impact end and said support means pivotably supporting said impact reaction means for maintaining said impact reaction means and said impact end generally flush in engagement during movement of the drawbar relative to the housing assembly, interposed means between said housing assembly and said stop end for maintaining said front wall of said housing assembly in engaging position with said impact end of said drawbar regardless of a change in longitudinal dimension of said housing due to wear.

17. The improvement in accordance with claim 16, said interposed means between said housing assembly and said stop end including a wedge vertically disposed between one end of said housing assembly and said stop,
said wedge dropping vertically between said housing assembly end and said stop end to accommodate wear on the ends of said housing assembly.

* * * * *